(12) United States Patent
Garcia et al.

(10) Patent No.: US 9,584,709 B2
(45) Date of Patent: Feb. 28, 2017

(54) ACTUATOR HOUSING FOR SHIELDING ELECTROMAGNETIC INTERFERENCE

(71) Applicant: MICROSOFT TECHNOLOGY LICENSING, LLC, Redmond, WA (US)

(72) Inventors: Benjamin Douglas Garcia, Seattle, WA (US); Daniel Joseph Turowski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/624,542

(22) Filed: Feb. 17, 2015

(65) Prior Publication Data

US 2016/0241761 A1   Aug. 18, 2016

(51) Int. Cl.
H04N 5/225   (2006.01)

(52) U.S. Cl.
CPC ......... *H04N 5/2257* (2013.01); *H04N 5/2252* (2013.01); *H04N 5/2253* (2013.01); *H04N 5/2254* (2013.01)

(58) Field of Classification Search
CPC .. H04N 5/2257; H04N 5/2252; H04N 5/2254; H04N 5/2253
USPC ....................................................... 348/374
See application file for complete search history.

(56) References Cited

U.S. PATENT DOCUMENTS

| 5,118,925 A | 6/1992 | Mims et al. |
|---|---|---|
| 5,136,119 A | 8/1992 | Leyland |
| 5,761,053 A | 6/1998 | King et al. |
| 6,211,457 B1 | 4/2001 | Cama et al. |
| 6,900,843 B1 | 5/2005 | Uchiyama |
| 7,997,812 B2 | 8/2011 | Kim |
| 8,077,480 B2 | 12/2011 | Ophoven et al. |
| 8,525,045 B2 | 9/2013 | Yamaguchi et al. |
| 8,643,772 B2 | 2/2014 | Anderson |
| 2006/0181633 A1* | 8/2006 | Seo ............... H04N 5/2251 348/340 |

(Continued)

FOREIGN PATENT DOCUMENTS

| EP | 1944807 A1 | 7/2008 |
|---|---|---|
| JP | S58182966 A | 10/1983 |

(Continued)

OTHER PUBLICATIONS

Chandler, Nathan, "How Faraday Cages Work", Published on: Jul. 22, 2011 Available at: http://science.howstuffworks.com/faraday-cage.htm.

(Continued)

*Primary Examiner* — Gevell Selby
(74) *Attorney, Agent, or Firm* — Brandon Roper; Judy Yee; Micky Minhas

(57) ABSTRACT

Examples of the disclosure provide a camera module configured to shield an image sensor from an electromagnetic field. In some examples, the camera module includes a circuit board, an image sensor coupled to the circuit board, a housing coupled to the circuit board such that the housing shields the image sensor from an electromagnetic field, and a lens barrel coupled to the housing such that the lens barrel is moveable within a cavity defined by the housing. Examples of the disclosure enable an electromagnetic field to be blocked in a cost-effective and component-efficient manner.

20 Claims, 4 Drawing Sheets

(56) References Cited

U.S. PATENT DOCUMENTS

| | | | |
|---|---|---|---|
| 2009/0256931 A1* | 10/2009 | Lee | H01L 24/97 |
| | | | 348/231.99 |
| 2010/0128455 A1 | 5/2010 | Ophoven et al. | |
| 2011/0130177 A1* | 6/2011 | Halliday | H01L 27/14618 |
| | | | 348/342 |
| 2013/0242181 A1 | 9/2013 | Phoon et al. | |
| 2013/0308048 A1* | 11/2013 | Park | H04N 5/2254 |
| | | | 348/374 |
| 2014/0043519 A1* | 2/2014 | Azuma | H04N 5/2252 |
| | | | 348/345 |
| 2014/0104449 A1 | 4/2014 | Masarik et al. | |
| 2015/0097946 A1* | 4/2015 | Stout | H04N 5/222 |
| | | | 348/135 |

FOREIGN PATENT DOCUMENTS

| | | |
|---|---|---|
| WO | 2008023894 A1 | 2/2008 |
| WO | 2013074578 A1 | 5/2013 |
| WO | 2014026202 A2 | 2/2014 |

OTHER PUBLICATIONS

"International Search Report and Written Opinion Issued in PCT Application No. PCT/US2016/016477", Mailed Date: Apr. 14, 2016, 12 Pages.

\* cited by examiner

ACTUATOR HOUSING FOR SHIELDING ELECTROMAGNETIC INTERFERENCE

BRIEF DESCRIPTION OF THE DRAWINGS

Corresponding reference characters indicate corresponding parts throughout the drawings.

DETAILED DESCRIPTION

Some mobile devices, such as tablets and mobile phones, include electronic components that radiate electrical signals. For example, some mobile devices include cameras that emit high frequency signals that introduce noise, such as electromagnetic interference (EMI), to other signals associated with the mobile device, such as a local area wireless technology (e.g., WiFi) signals, BLUETOOTH brand short range signals, cellular signals, and other communication signals. Moreover, the other signals associated with the mobile device may introduce EMI to the high frequency signals emitted from the camera. To attenuate the EMI between the camera and the other components of the mobile device, some mobile device manufacturers add a sheet metal can to the camera module provided by camera manufacturers. This additional sheet metal can is mounted over the camera to physically block at least a portion of the signals between the camera and the other components. The addition of another component to the camera module, however, increases production cost, manufacturing cost, and/or physical footprint associated with the camera module.

Examples of the disclosure enable a mobile device to attenuate noise between a camera and one or more other components of a mobile device in a cost- and/or spatially-efficient manner. In some examples, a camera module includes a circuit board, an image sensor coupled to the circuit board, a housing coupled to the circuit board such that the housing shields the image sensor from an electromagnetic field, and a lens barrel coupled to the housing such that the lens barrel is moveable (e.g., by an actuator) within a cavity defined by the housing. The actuator may be used to autofocus one or more lenses held by the lens barrel. The housing may be thus referred to as an autofocus motor housing.

Aspects of the disclosure enable an electromagnetic field to be shielded using components included in a mobile device and/or camera module that provide other functions. In this way, the mobile device may be used to transmit signals with little to no EMI from the camera and/or the camera may be used to operate with little to no EMI from the other components of the mobile device while controlling the cost, component count, weight, and/or footprint associated with the camera module. Some examples block, restrict, and/or prevent the camera from inducing noise over desirable signals, and/or protect a sensor from interferences from other signals. This enables cleaner power supplies and/or results in an image that would be less noisy than conventional systems. By incorporating a camera module in the manner described in this disclosure, some examples increase user interaction performance and/or increase system functionality by robustly shielding the camera (and other components) from EMI while reducing the cost, component count, weight, and/or footprint associated with the camera module as compared to conventional camera modules.

Figure 1:
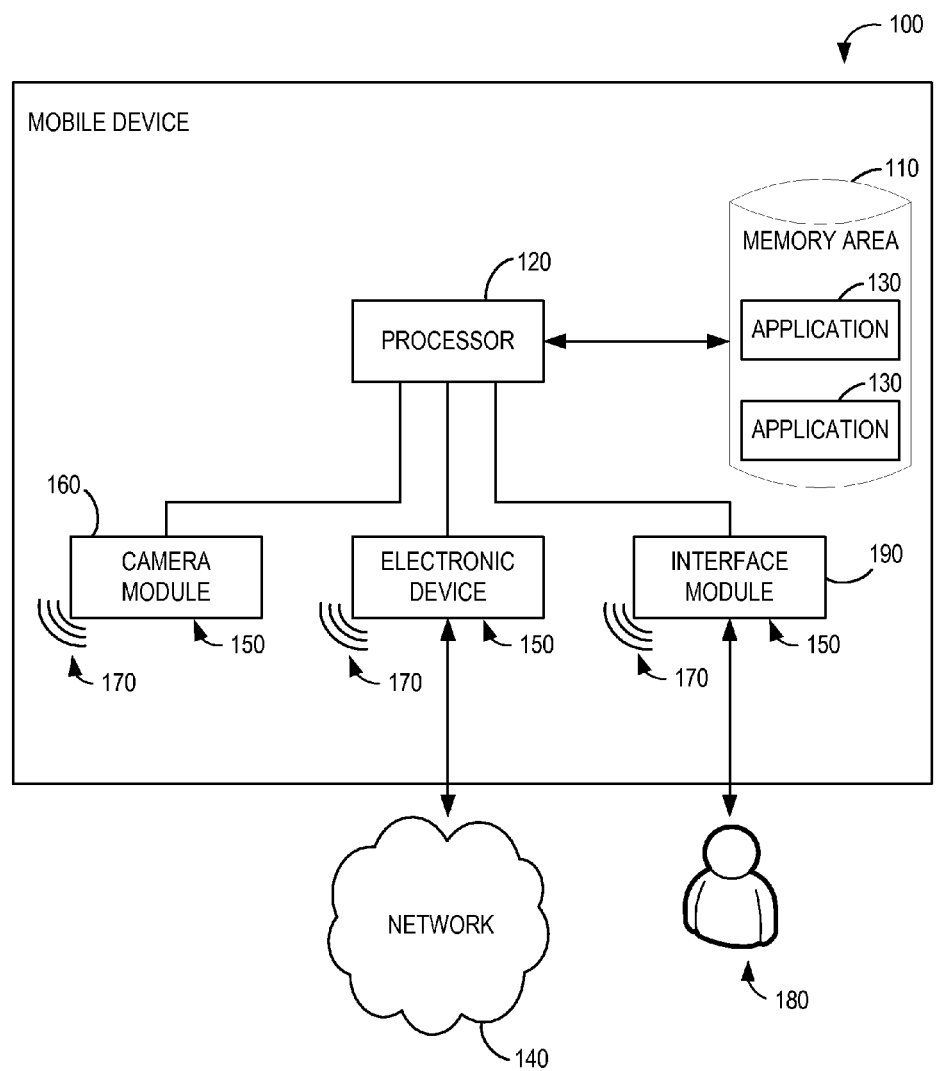
FIG. 1 is an example schematic diagram illustrating a mobile device.

Referring to FIG. 1, an example schematic diagram of a mobile device 100 is provided. While some examples of the disclosure are illustrated and described herein with reference to a mobile device 100, aspects of the disclosure are operable with any computing device that includes a plurality of electronic devices that radiate electrical signals (e.g., a radio). For example, the mobile device 100 may include a portable media player, a mobile telephone, a tablet, a netbook, a laptop, a desktop computer, a computing pad, a kiosk, a tabletop device, an industrial control device, a wireless charging station, an electric automobile charging station, a wearable device (e.g., a wrist-worn device or a head-mounted device), and other computing devices.

In the example of FIG. 1, the mobile device 100 includes one or more computer-readable media, such as a memory area 110 storing computer-executable instructions and/or other data, and one or more processors 120 configured to execute the computer-executable instructions. The memory area 110 includes any quantity of media associated with or accessible by the mobile device 100. The memory area 110 may be internal to the mobile device 100 (as shown in FIG. 1), external to the mobile device 100 (not shown), or both (not shown).

In some examples, the memory area 110 stores, among other data, one or more applications 130. The applications 130, when executed by the processor 120, operate to perform a functionality on the mobile device 100. Example applications include a mail application program, a web browser, a calendar application program, an address book application program, a messaging program, a media program, a location-based service program, a search program, and the like. The applications 130 may communicate with counterpart applications or services, such as web services accessible via a network 140. For example, the applications 130 may represent downloaded client-side applications that correspond to server-side services executing in the cloud.

The processor 120 includes any quantity of processing units associated with or accessible by the mobile device 100. The computer-executable instructions may be executed by one or more processors within the mobile device 100 and/or external to the mobile device 100. In some examples, the processor 120 is transformed into a special purpose microprocessor by executing computer-executable instructions or by otherwise being configured. Although the processor 120 is shown separate from the memory area 110, examples of the disclosure contemplate that the memory area 110 may be onboard the processor 120 such as in some embedded systems.

In this example, the mobile device 100 includes a plurality of electronic devices 150, such as one or more camera modules 160. Each electronic device 150 emits and/or receives one or more electrical signals 170, such as a mobile phone signal (e.g., from a cellular network), a WiFi signal, a BLUETOOTH brand short range signal, and/or other electronic signals. For example, a first electronic device 150 is configured to emit a first electromagnetic field and/or radiation, and a second electronic device (e.g., camera module 160) is configured to emit a second electromagnetic field and/or radiation. In some examples, one or more electronic devices 150 are configured to exchange data between the mobile device 100 and a user 180, computer-readable media, and/or another computing device (not shown). In at least some examples, the electronic devices 150 includes one or more interface modules 190 configured to present information, such as text, images, audio, video, graphics, alerts, and the like, to the user. For example, the interface module 190 may include and/or be coupled to, without limitation, a capacitive touch screen display, a speaker, and/or a vibrating component. Additionally or alternatively, the interface module 190 is configured to receive information, such as user commands, from the user 180. For example, the interface module 190 may include and/or be coupled to, without limitation, a capacitive touch screen display, a keyboard, a mouse, and/or a microphone.

Figure 2:
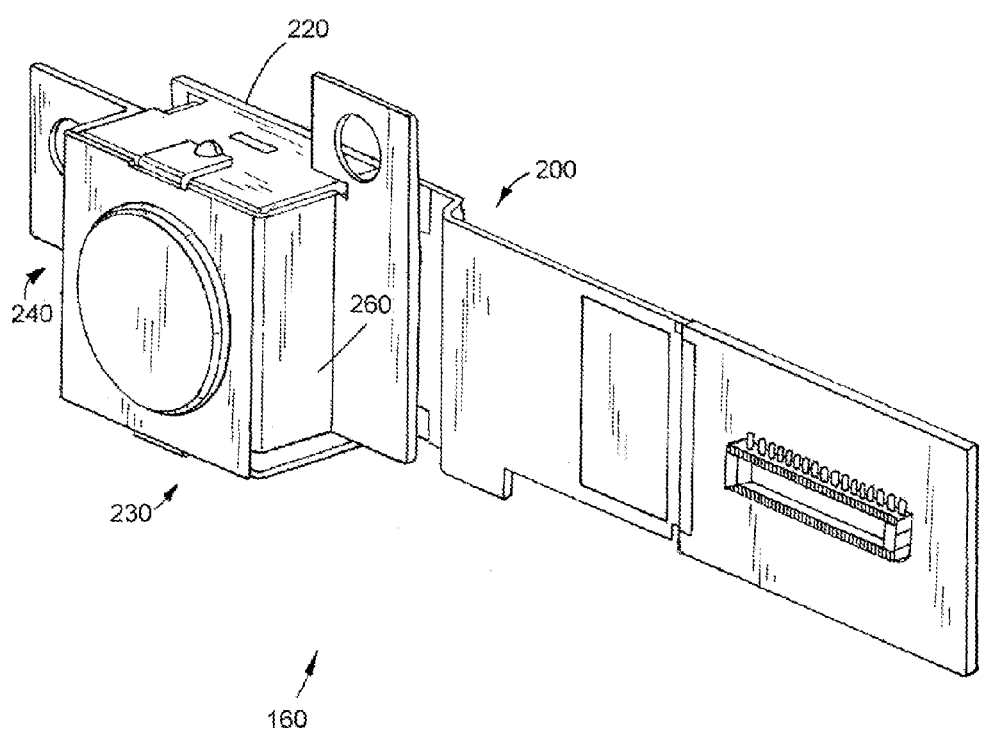
FIG. 2 is an example perspective view of a camera module used with a mobile device such as shown in FIG. 1.
Figure 3:
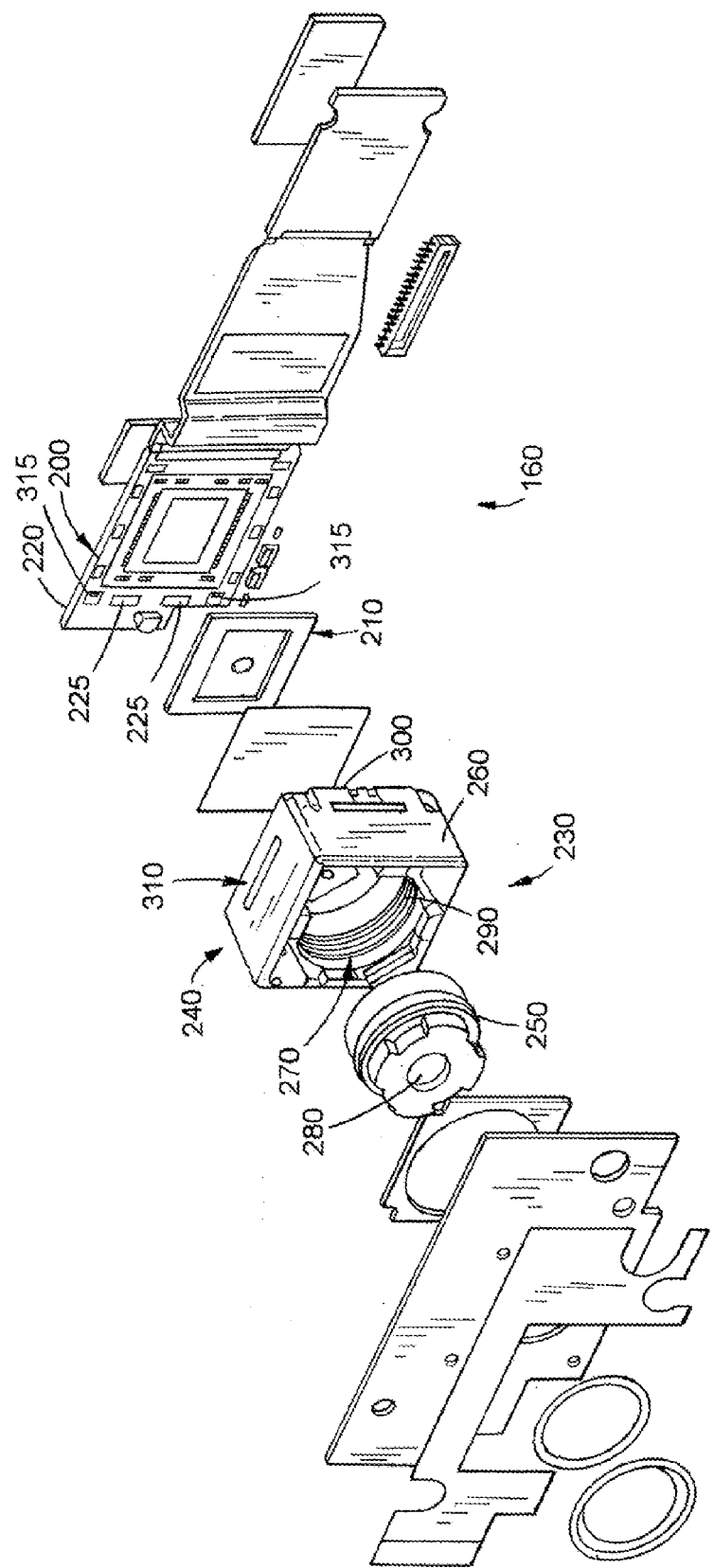
FIG. 3 is an example exploded view of the camera module shown in FIG. 2.

Referring to FIGS. 2 and 3, example views of the camera module 160 is provided. In this example, the camera module 160 includes a circuit board 200 and an image sensor 210 (shown in FIG. 3) coupled to the circuit board 200. In at least some examples, the image sensor 210 is coupled to the circuit board 200 proximate to another electronic device 150. In some examples, the circuit board 200 is a rigid-flex printed circuit board that includes a plurality of layers. Alternatively, the circuit board 200 may be any type of circuit board that includes any number of layers that enables the camera module 160 to function as described herein. In at least some examples, an upper layer (e.g., a solder mask) of a plurality of layers has one or more openings 225 that at least partially expose a lower layer (e.g., a ground plane 220) of the plurality of layers. Alternatively, any layer may include a ground plane that enables the camera module 160 to function as described herein.

In this example, the image sensor 210 is a complementary metal-oxide semiconductor (CMOS) active pixel type image sensor. Alternatively, the image sensor may be any type of sensor that enables the mobile device 100 to function as described herein.

In this example, the camera module 160 includes an actuator 230 including a housing 240 and a lens barrel 250 (shown in FIG. 3) coupled to the housing 240, such that the lens barrel 250 is moveable with respect to the housing 240. In this example, the housing 240 includes one or more outer walls 260 that define a cavity 270 (shown in FIG. 3), and the lens barrel 250 is moveable within the cavity 270, such that a lens 280 (shown in FIG. 3) coupled to the lens barrel 250 is positionable and/or orientable with respect to the image sensor 210. In this example, the actuator 230 is a voice coil motor (VCM) that is configured to move the lens barrel 250 to enable the lens 280 to render a focused image of an object (not shown) onto the image sensor 210. For example, at least some VCMs include a lens barrel 250, into which a lens 280 is installed, a coil of wire 290 extending about the lens barrel 250, a plurality of magnets adjacent to the lens barrel 250, a plurality of springs, a clamshell structure including a plurality of plastic elements and housing the magnets, and a housing 240 that encapsulates at least the top and the sides of the VCM. Alternatively, the actuator 230 and/or the VCM may include any components that enable the camera module 160 to function as described herein.

In this example, the outer walls 260 extend about the image sensor 210, such that the image sensor 210 is within the cavity 270, and are positioned to shield the image sensor 210 (and/or other components) from an electromagnetic field and/or radiation emitted from outside the camera module 160, such as one or more of the electrical signals 170. In some examples, the housing 240 and the circuit board 200 are positioned to block, restrict, and/or prevent electromagnetic radiation between the image sensor 210 and another electronic device 150 proximate to the image sensor 210 and outside the cavity 270. At least some examples, the outer walls 260 block, restrict, and/or prevent the electromagnetic field and/or radiation from traversing and/or passing through the outer wall 260, such that the image sensor 210 is protected from the electromagnetic field and/or radiation (e.g., the first electromagnetic radiation emitted from outside the camera module 160). Additionally or alternatively, the outer walls 260 block, restrict, and/or prevent the electromagnetic field and/or radiation from traversing and/or passing through the outer wall 260, such that one or more electronic devices 150 (shown in FIG. 1) are protected from an electromagnetic field and/or radiation emitted from within the camera module 160 (e.g., the second electromagnetic radiation emitted from within the camera module 160). In at least one example, the second electromagnetic radiation is generated by movement of the image sensor 210 via the lens holder 250. Alternatively, the image sensor 210 may generate the second electromagnetic radiation in any manner that enables the camera module 160 to function as described herein.

In this example, the outer walls 260 have a lower edge 300 (shown in FIG. 3) that is directly coupled to the circuit board 200, such that there is no gap between the lower edge 300 and the circuit board 200 and the actuator and the circuit board 200 form an enclosure about the image sensor 210. In some examples, the actuator 230 and the circuit board 200 shield the image sensor 210 from an electromagnetic field and/or radiation emitted from outside the camera module 160, such as one or more of the electrical signals 170. For example, the actuator 230 and/or the circuit board 200 shield wireless local area network (WLAN) frequencies below approximately 6.0 GHz (e.g., 2.4 GHz, 3.6 GHz, 4.9 GHz, 5 GHz, 5.9 GHz), cellular frequencies between approximately 700 MHz and approximately 2500 MHz (e.g., 700 MHz, 1700 MHz, and 1900 MHz for Long-Term Evolution networks in the United States), and/or the lower harmonics of the WLAN frequencies and/or the cellular frequencies. In at least some examples, the electromagnetic field and/or radiation are blocked, restricted, and/or prevented from traversing and/or passing through the outer wall 260, through the circuit board 200, and/or between the outer wall 260 and the circuit board 200, such that the image sensor 210 is protected from the electromagnetic field and/or radiation. Additionally or alternatively, the electromagnetic field and/or radiation are blocked, restricted, and/or prevented from traversing and/or passing through the outer wall 260, through the circuit board 200, and/or between the outer wall 260 and the circuit board 200, such that one or more electronic devices 150 (shown in FIG. 1) are protected from an electromagnetic field and/or radiation emitted from within the camera module 160.

In some examples, the outer walls 260 include a conductive material, and the ground plane 220 that includes a conductive material. The conductive material includes any material capable of allowing electrical energy to flow therethrough. Example conductive materials include metals and nonmetallic conductors, such as polymers (e.g., liquid crystal polymers). For example, the outer walls 260 may be composed of one or more metals, may be metallized, and/or may be coated with one or more polymers to enable conductivity.

In at least some examples, the outer walls 260 are coupled to the ground plane 220, such that the actuator 230 is grounded. In at least some examples, the combination of the actuator 230 and the circuit board 200 form a Faraday cage about the image sensor 210. In at least some examples, the lower edges 300 are in direct contact with the circuit board 200 along a ground trace that extends along and/or adjacent to a perimeter of the housing 240. In such examples, the housing 240 is positioned on and/or adjacent to a top layer of the circuit board 200 and, from the ground trace, a plurality of vias extend between the top layer and the ground plane 220. Alternatively, the housing 240 may be coupled to the circuit board 200 in any manner and/or using any mechanism that enables the camera module 160 to function as described herein. In at least some examples, the housing 240 is coupled to a chassis to connect a camera electrical ground to a system electrical ground. This may be achieved by plane-on-plane contact, clamping with screws, copper tape, conductive adhesive, and/or any other mechanism that enables camera module 160 to function as described herein.

In some examples, the actuator 230 and/or the circuit board 200 includes one or more gaps, apertures, or other openings 310 and 315 (shown in FIG. 3) extending through the one or more outer walls 260 and/or circuit board 200, respectively. In at least some examples, the openings 310 and/or 315 are smaller than a wavelength of an electromagnetic field and/or radiation to which the image sensor 210 and/or the electronic devices 150 is sensitive (e.g., smaller than a first wavelength of the first electromagnetic radiation and/or a second wavelength of the second electromagnetic radiation), such that the actuator 230 is configured to shield the image sensor 210 from the electromagnetic field and/or radiation. In this example, the image sensor 210 is sensitive to one or more electromagnetic fields and/or radiation emitted by one or more electronic devices 150 (shown in FIG. 1). Additionally or alternatively, one or more electronic devices 150 are sensitive to one or more electromagnetic fields and/or radiation emitted by the image sensor 210. In one example, the openings 310 and/or 315 are smaller than approximately 1.8 mm in width. Alternatively, the openings 310 and/or 315 may have any width and/or diameter that enables the camera module 160 to function as described herein. For example, to restrict transmission of 2.4 gigahertz frequencies, the openings 310 and/or 315 are configured to be less than approximately 2.5 mm in diameter. In at least some examples, the size of the openings 310 and/or 315 are a predetermined fraction of the wavelength (e.g., one-fourth of the wavelength, one-tenth of the wavelength, or one-twentieth of the wavelength.

In some examples, the openings 310 and/or 315 are sized to provide access that enables the outer wall 260 to be coupled to the circuit board 200. In at least some examples, the openings 310 and/or 315 are sized to enable the actuator 230 to be soldered to the circuit board 200 via laser or selective soldering techniques. Alternatively, the actuator 230 may be coupled to the circuit board 200 using any technique and/or mechanism that enables the camera module 160 to function as described herein. For example, the actuator 230 may be soldered to the circuit board 200, coupled to the circuit board 200 using conductive foam, epoxy, and/or tape, pressed into the circuit board 200 via plane-on-plane contact, and/or coupled to the circuit board 200 using one or more spring fingers. In some examples, the openings 310 and/or 315 are selectively adjustable between a closed configuration and an open configuration. In such examples, the actuator 230 is configured to shield the image sensor 210 from an electromagnetic field when the openings 310 and/or 315 are in the closed configuration, and configured to provide access that enables the actuator 230 to be coupled to the circuit board 200 when the openings 310 and/or 315 are in the open configuration.

Figure 4:
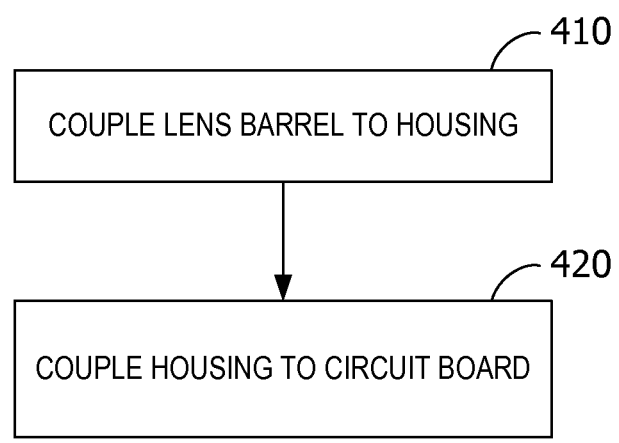
FIG. 4 is an example flow chart illustrating a method of shielding an electromagnetic field using a camera module, such as shown in FIGS. 2 and 3.

FIG. 4 is an example flow chart illustrating a method 400 for shielding an image sensor 210 from an electromagnetic field. In this example, the lens barrel 250 is coupled to the housing 240 at 410, such that the lens barrel 250 is moveable within the cavity 270 defined by the housing 240.

In this example, the housing 240 is coupled to the circuit board 200 at 420, such that the housing 240 shields the image sensor 210 from the electromagnetic field. In some examples, the circuit board 200 is accessed through one or more openings 310 extending through the outer walls 260 and/or one or more outer walls 260 are accessed through one or more openings 315 extending through the circuit board 200 to couple the housing 240 to the circuit board 200. For example, the housing 240 is coupled to the circuit board 200 using a solder, a conductive foam, an epoxy, a tape, and/or a spring finger. Alternatively, the housing 240 may be coupled to the circuit board 200 using any technique and/or mechanism that enables the camera module 160 to function as described herein.

In some examples, the housing 240 is coupled to the circuit board 200, such that the image sensor 210 is within the cavity 270. In some examples, the outer walls 260 of the housing 240 are coupled directly to the ground plane 220 of the circuit board 200, such that the housing 240 is grounded. In at least some examples, a conductive material of the housing 240 is coupled to a conductive material of the circuit board 200, such that the conductive materials form an enclosure about the image sensor 210.

The subject matter described herein enables shielding an image sensor from an electromagnetic field. The examples of the disclosure enable a mobile device to attenuate noise between the image sensor and another electronic device in a cost- and/or spatially-efficient manner, thereby enabling one or more of the following: reducing a bezel width of a mobile phone or tablet (which would otherwise be limited by the camera footprint); reducing a thickness of a mobile phone or tablet (which would otherwise be limited by the camera height); reducing a weight of a mobile phone or tablet, reducing an overall size of a mobile phone or tablet; allocating the volume "saved" from the examples of the disclosure to another component; reducing a production and/or manufacturing cost (e.g., by eliminating application and use of an additional shield); improving a performance of a communication device or component (e.g., radios on the mobile device); and positioning a communication device or component (e.g., antennas) closer to the camera(s).

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, configurable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

The examples illustrated and described herein as well as examples not specifically described herein but within the scope of aspects of the disclosure constitute example means for shielding an image sensor from an electromagnetic field. For example, the elements illustrated in FIG. 2 constitute example means for coupling a lens barrel to a housing, and example means for coupling the housing to a circuit board.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

a radio configured to emit a first electromagnetic radiation;

a camera module;

a circuit board;

an image sensor coupled to the circuit board;

an image sensor coupled to the circuit board proximate to the electronic device, the image sensor configured to emit a second electromagnetic radiation;

a housing defining a cavity, the housing coupled to the circuit board, such that the housing and the circuit board are positioned to restrict electromagnetic radiation between the image sensor and an electronic device proximate to the image sensor;

a housing directly coupled to the circuit board, the housing extending about the image sensor, such that the housing shields the image sensor from the first electromagnetic radiation and shields the electronic device from the second electromagnetic radiation;

a conductive housing defining a cavity, the housing electrically coupled to the circuit board;

a lens barrel coupled to the housing, such that the lens barrel is moveable within the cavity;

the image sensor within the cavity;

the circuit board including a ground, the housing directly coupled to the ground, such that the housing is grounded;

the circuit board including a ground, and the housing including a conductive material that extends about the image sensor, such that the conductive material and the ground form an enclosure about the image sensor;

the housing directly coupled to the circuit board, such that a Faraday cage is formed about the image sensor;

the housing including one or more walls having one or more openings extending therethrough, the one or more openings smaller than a wavelength of the electromagnetic radiation;

the housing including one or more walls having one or more openings extending therethrough, the one or more openings smaller than a first wavelength of the first electromagnetic radiation and a second wavelength of the second electromagnetic radiation;

the housing including one or more walls having one or more openings extending therethrough, the one or more openings sized to provide access to the circuit board to enable the housing to be coupled to the circuit board;

coupling a lens barrel to a housing, such that the lens barrel is moveable within a cavity defined by the housing;

coupling the housing to a circuit board, such that the housing shields one or more electronic devices proximate to an image sensor from an electromagnetic field generated by movement of the image sensor via a lens holder;

coupling the housing to the circuit board, such that the image sensor is within the cavity;

coupling the housing directly to a ground of the circuit board, such that the housing is grounded;

coupling a conductive material of the housing extending about the image sensor to a ground of the circuit board, such that the conductive material and the ground form an enclosure about the image sensor;

coupling the housing directly to the circuit board, such that a Faraday cage is formed about the image sensor;

accessing the circuit board through one or more openings extending through one or more walls of the housing to couple the housing to the circuit board, the one or more openings smaller than a wavelength of a radiation to which an image sensor is sensitive; and coupling the housing directly to the circuit board using one or more of soldering, conductive foam, epoxy, tape, and a spring finger.

While the aspects of the disclosure have been described in terms of various examples with their associated operations, a person skilled in the art would appreciate that a combination of operations from any number of different examples is also within scope of the aspects of the disclosure.

What is claimed is:

1. A camera module comprising:
   a circuit board;
   an image sensor coupled to the circuit board;
   a conductive housing defining a cavity, the housing electrically coupled to the circuit board; and
   a lens barrel directly coupled to the housing, such that the lens barrel is moveable within the cavity,
   wherein the housing comprises one or more walls having one or more openings extending therethrough, the one or more openings smaller than a wavelength of the electromagnetic radiation.

2. The camera module of claim 1, wherein the image sensor is within the cavity.

3. The camera module of claim 1, wherein the circuit board comprises a ground, the housing directly coupled to the ground, such that the housing is grounded.

4. The camera module of claim 1, wherein the circuit board comprises a ground, and the housing comprises a conductive material that extends about the image sensor, such that the conductive material and the ground form an enclosure about the image sensor.

5. The camera module of claim 1, wherein the housing is directly coupled to the circuit board, such that a Faraday cage is formed about the image sensor.

6. The camera module of claim 1, wherein the one or more openings are sized to provide access to the circuit board to enable the housing to be coupled to the circuit board.

7. The camera module of claim 1, wherein the housing is in direct contact with the circuit board.

8. A mobile device comprising:
    a radio configured to emit a first electromagnetic radiation; and
    a camera module comprising:
        a circuit board;
        an image sensor coupled to the circuit board proximate to the electronic device, the image sensor configured to emit a second electromagnetic radiation;
        a conductive housing electrically coupled to the circuit board; and
        a lens barrel coupled to the housing, such that the lens barrel is moveable within the cavity,
        wherein the housing comprises one or more walls having one or more openings extending therethrough, the one or more openings smaller than a wavelength of the electromagnetic radiation.

9. The mobile device of claim 8, wherein the circuit board comprises a ground, and the housing is directly coupled to the ground, such that the housing is grounded.

10. The mobile device of claim 8, wherein the circuit board comprises a ground, and the housing comprises a conductive material that extends about the image sensor, such that the conductive material and the ground form an enclosure about the image sensor.

11. The mobile device of claim 8, wherein the housing is coupled directly to the circuit board, such that a Faraday cage is formed about the image sensor.

12. The mobile device of claim 8, wherein the one or more openings are smaller than a first wavelength of the first electromagnetic radiation and a second wavelength of the second electromagnetic radiation.

13. The mobile device of claim 8, wherein the one or more openings are sized to provide access to a circuit board to enable the housing to be coupled to the circuit board.

14. A method comprising:
    coupling a lens barrel to a housing, such that the lens barrel is moveable within a cavity defined by the housing, the housing containing an image sensor coupled to a circuit board; and
    directly coupling the housing to the circuit board, such that the housing shields one or more electronic devices proximate to the image sensor from an electromagnetic field generated by movement of the image sensor via the lens barrel, wherein the housing comprises one or more walls having one or more openings extending therethrough, the one or more openings being smaller than a wavelength of the electromagnetic radiation.

15. The method of claim 14, wherein coupling the housing comprises coupling the housing to the circuit board, such that the image sensor is within the cavity.

16. The method of claim 14, wherein coupling the housing comprises coupling the housing directly to a ground of the circuit board, such that the housing is grounded.

17. The method of claim 14, wherein coupling the housing comprises coupling a conductive material of the housing extending about the image sensor to a ground of the circuit board at the plane-on-plane contact of the housing to the circuit board, such that the conductive material and the ground form an enclosure about the image sensor.

18. The method of claim 14, wherein coupling the housing comprises coupling the housing directly to the circuit board, such that a Faraday cage is formed about the image sensor.

19. The method of claim 14, wherein coupling the housing comprises accessing the circuit board through one or more openings extending through one or more walls of the housing to couple the housing to the circuit board, the one or more openings smaller than a wavelength of a radiation to which an image sensor is sensitive.

20. The method of claim 14, wherein coupling the housing comprises coupling the housing directly to the circuit board using one or more of soldering, conductive foam, epoxy, tape, and a spring finger.

* * * * *